(12) United States Patent
Bingol et al.

(10) Patent No.: US 10,051,033 B2
(45) Date of Patent: Aug. 14, 2018

(54) PROVIDING AUDIO DATA FOR A REMOTE DESKTOP PROTOCOL IN A STANDARDS-BASED WEB BROWSER

(71) Applicant: Dell Products L.P., Round Rock, TX (US)

(72) Inventors: Evren Bingol, San Francisco, CA (US); Curtis J. Schwebke, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 14/928,078

(22) Filed: Oct. 30, 2015

(65) Prior Publication Data

US 2017/0126776 A1    May 4, 2017

(51) Int. Cl.
- *G06F 15/16* (2006.01)
- *H04L 29/08* (2006.01)
- *H04L 29/06* (2006.01)

(52) U.S. Cl.
CPC ........ *H04L 67/025* (2013.01); *H04L 63/0869* (2013.01); *H04L 63/205* (2013.01); *H04L 67/04* (2013.01); *H04L 67/08* (2013.01)

(58) Field of Classification Search
CPC ....... H04L 67/025; H04L 67/08; H04L 67/04; H04L 63/205
See application file for complete search history.

(56) References Cited

U.S. PATENT DOCUMENTS

| | | | |
|---|---|---|---|
| 6,873,625 B1* | 3/2005 | Yoo | H04L 29/06027 370/395.64 |
| 7,839,860 B2 | 11/2010 | Kobayashi | |
| 7,853,121 B2 | 12/2010 | Yahata | |
| 8,509,555 B2 | 8/2013 | Meany | |
| 8,887,060 B2 | 11/2014 | Maity | |
| 9,628,810 B1 | 4/2017 | Bingol | |
| 2009/0125636 A1* | 5/2009 | Li | H04L 65/4092 709/231 |
| 2010/0070634 A1* | 3/2010 | Ranjan | H04L 63/0869 709/228 |
| 2010/0299701 A1 | 11/2010 | Liu | |
| 2013/0080865 A1* | 3/2013 | Palm | G06F 17/30905 715/202 |
| 2014/0040767 A1 | 2/2014 | Bolia | |
| 2014/0185950 A1 | 7/2014 | Saint Macary | |
| 2015/0207904 A1 | 7/2015 | Siegman | |
| 2017/0126775 A1 | 5/2017 | Bingol | |
| 2017/0126842 A1 | 5/2017 | Bingol | |

* cited by examiner

*Primary Examiner* — Padma Mundur
(74) *Attorney, Agent, or Firm* — Baker Botts L.L.P.

(57) ABSTRACT

A web client may receive a first packet of audio data encoded in a first audio format from a web-socket server over a web socket connection between the web-socket server and the web client. The web client may convert the audio data such that the first packet is encoded in a second audio format, and the second audio format may be compatible with the web client. The web client may calculate a trip time for the first packet. The web client may send a second packet including an indication of the trip time to an RDP server by way of the web-socket server over a socket connection between the RDP server and the web-socket server. The web client may present the audio data using an audio canvas of the web client, and the audio data may be associated with an interface for viewing and interacting with a remote desktop.

20 Claims, 4 Drawing Sheets

PROVIDING AUDIO DATA FOR A REMOTE DESKTOP PROTOCOL IN A STANDARDS-BASED WEB BROWSER

TECHNICAL FIELD

This disclosure relates generally to providing audio in a standards-based web browser and, more particularly, to implementing an audio player for a remote desktop protocol (RDP) in a web browser, for example, a standards-based web browser, using a cross-platform web scripting language, such as JAVASCRIPT.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

In desktop virtualization or remote working environments, a remote server provides desktop and application resources to a user. The desktop or application resource are published to the user's computing device or information handling system by way of a protocol, such as the remote desktop protocol (RDP). While the RDP protocol supports a number of audio formats, such as adaptive delta pulse code modulation (ADPCM), standards-based web browsers typically have limited native support for audio formats and may only support pulse code modulation (PCM) format. Configuring an RDP server to send audio in a PCM format may not be implementable as PCM does not support compression and the bandwidth requirements for sending audio in such a PCM format may be too high for a computing environment. The present invention addresses this issue by implementing a compressed audio format player for use in a standards-based web browser.

SUMMARY

In one embodiment a web client receives a first packet of audio data from a web-socket server over a web socket connection between the web-socket server and the web client, wherein the first packet is encoded in a first audio format. The web client determines one or more supported audio formats of a web browser of the web client and converts the audio data such that the first packet is encoded in a second audio format, wherein the second audio format is one of the one or more supported audio formats. The web client calculates a total consumption time for the first packet and sends a second packet to a remote desktop protocol (RDP) server by way of the web-socket server, wherein the second packet comprises an indication of the total consumption time. The total consumption time may comprise at least one of a transmission time and playback time for the first packet. The total consumption time may be indicative of a synchronization rate required for proper playback of the converted audio data. The playback time may be determined based, at least in part, on at least one of a number of bits of the audio data of the first packet and a sampling frequency of the audio data of the first packet. The web client presents the audio data using an audio application programming interface (API) of the web browser, wherein the audio data is associated with an interface for viewing and interacting with a remote desktop.

In one embodiment, an adaptive delta pulse code modulated (ADPCM) player converts the audio data. In one embodiment the ADPCM player may be implemented using JAVASCRIPT. In one embodiment the first audio format may be ADPCM and the second audio format may be pulse code modulation (PCM).

In one embodiment, one or more computer-readable non-transitory storage media embodying software that is operable when executed performs or implements one or more embodiments. In one embodiment, an information handling system comprising one or more processors, and a memory coupled to the processors comprising instructions executable by the processors, the processors operable when executing the instructions to perform or implement one or more embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
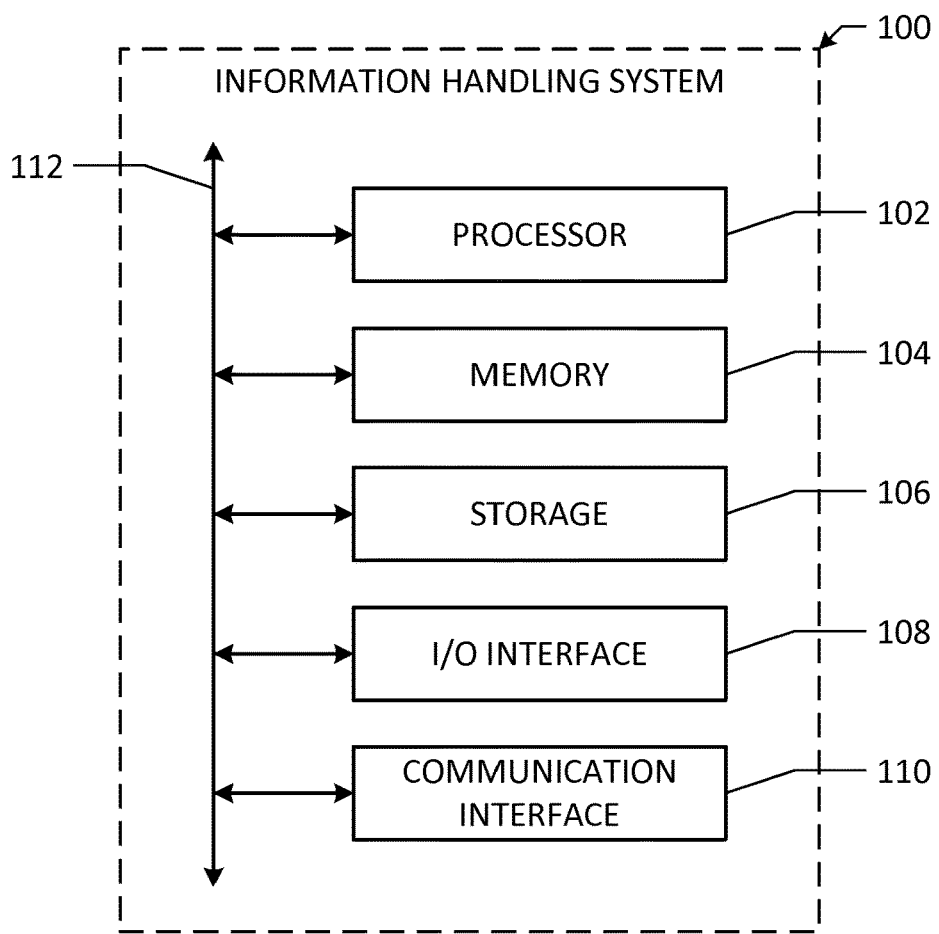
FIG. 1 is a block diagram of selected elements of an information handling system according to one or more embodiments of the present invention.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details.

In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Traditionally, remote desktop protocol (RDP) clients are written in a native, full-featured programming language such as C or C++. In such an environment, the native RDP client may make use of an operating system's audio library and installed coder/decoder (codec), such as MP3, Windows Media Audio, and Windows Media Video, to play compressed audio information. From within a web browser, audio must be in an uncompressed phase code modulated (PCM) format for playback by the web browser.

Implementing an adaptive delta PCM (ADPCM) player in a cross-platform web scripting language, such as JAVASCRIPT, for a standards-based web browser provides needed functionality for playback of audio. ADPCM may be used at the web server to compress a PCM stream by inserting deltas between different audio samples. The JAVASCRIPT audio player at the client receives a stream of ADPCM data contained in one or more RDP protocol data units (PDU) from the web server. The JAVASCRIPT player reconstructs the PCM stream from the deltas and plays the audio through a standards-based host web browser. The present invention provides appropriate flow control and does not suffer intractable synchronization problems.

Particular embodiments are best understood by reference to FIGS. 1-5, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
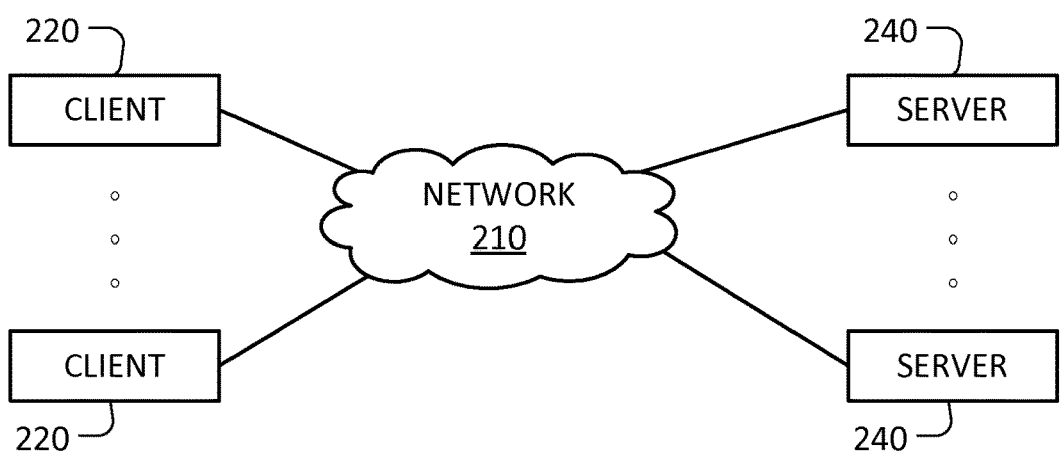
FIG. 2 is an example of a network environment according to one or more embodiments of the present invention.

FIG. 2 illustrates an example configuration of networked information handling systems (e.g., client devices and servers). In particular embodiments, one or more client devices 220 and one or more servers 240 are connected via network 210. Network 210 may be a public network or a private (e.g., corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g., a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g., corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g., corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g., videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g., thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g., automatically) device discovery, tracking of assets (e.g., hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (e.g., a thin client) may be designed with minimal or limited storage capacity (e.g., in a hard disk). The client device may be required, however, to run an operating system such as WINDOWS EMBEDDED or WINDOWS SERVER, but the footprint of such an operating system may grow over time with newer releases or updates. Hence, client devices may, over time, begin to run low on free storage space (e.g., in the hard disk). Unwanted files may be deleted or full volume compression of the storage medium (e.g., the hard disk) may be implemented to increase available storage space. However, full volume compression may introduce performance shortcomings (e.g., increased number of instruction cycles required to compress/uncompress data in the volume) from the point of view of an end user of the client device. In particular embodiments, optimized volume compression may be implemented to reduce effective disk usage on a client device while minimizing impact on system performance.

Figure 3:
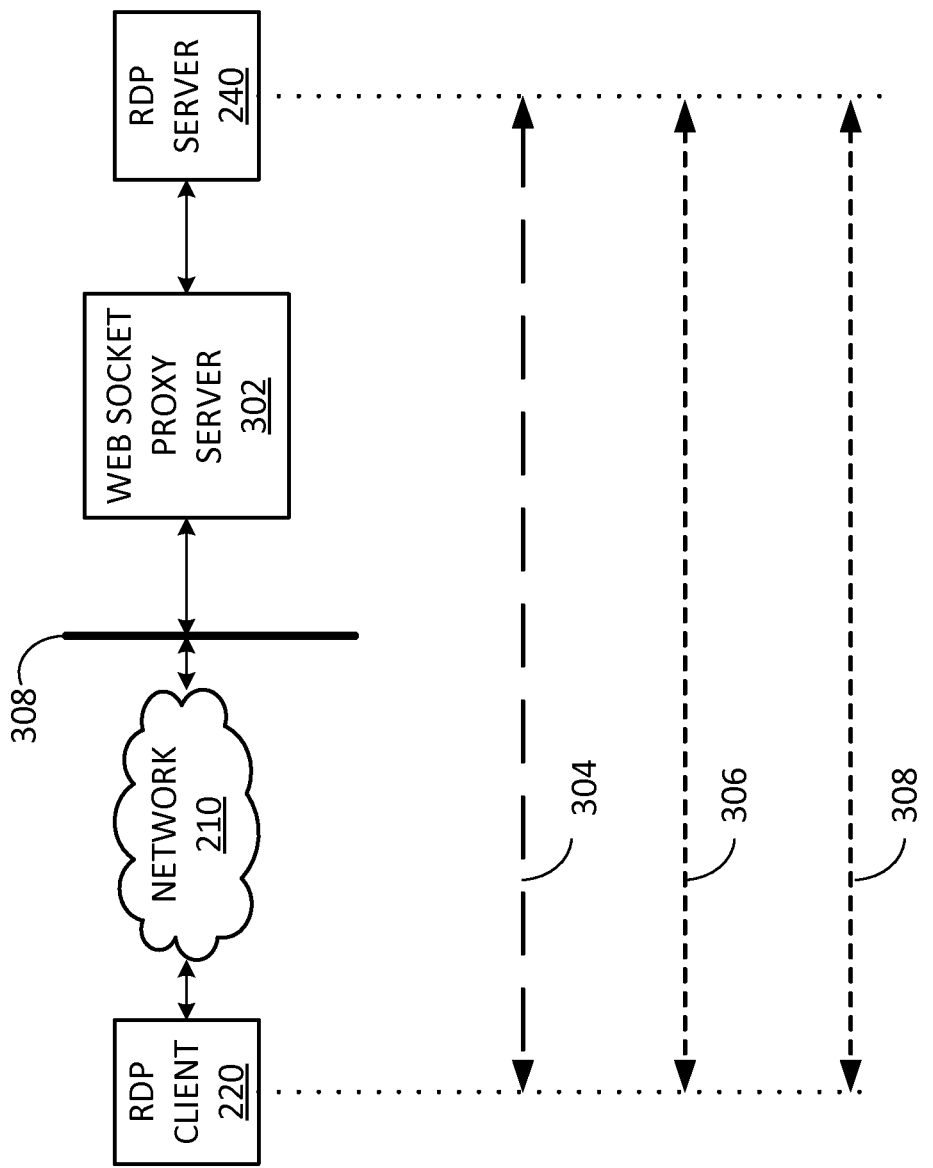
FIG. 3 is an example of a remote desktop protocol client according to one or more embodiments of the present invention.

FIG. 3 illustrates a client device 220, such as an RDP client 220, according to one or more embodiments of the present disclosure. In one or more embodiments RDP client 220 may comprise a standards-based web browser 310. The standards-based web browser 310 may be operable to present data via I/O interface to any one or more I/O devices 330 coupled to RDP client 220. The one or more I/O devices 330 may be coupled directly or indirectly to RDP client 220. I/O device 330 may be any known I/O device for presenting data to a user, such as a monitor, display, or any other graphical or textual interface known to one of ordinary skill in the art. RDP client 220 may also comprise a cross-platform web scripting language client 320. The cross-platform web scripting language client 320 may be implemented using JAVASCRIPT, hypertext markup language 5 (HTML5), any cross-platform web scripting language known to one of ordinary skill in the art or any combination thereof.

In particular embodiments, as described in connection with FIG. 4, an RDP client may be implemented in a web browser, such as a standards-based web browser. A web-socket server may be used to connect the RDP client implemented in a web browser to the RDP server.

Figure 4:
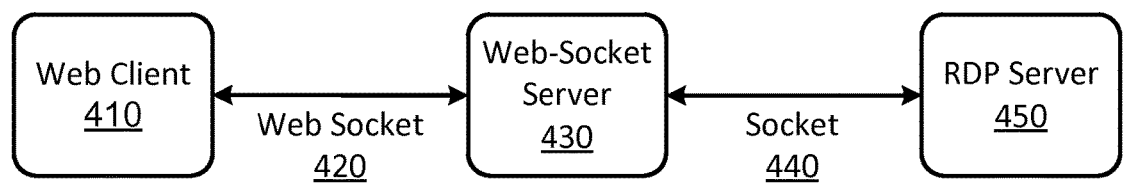
FIG. 4 is an example web-socket server environment according to one or more embodiments of the present invention.

FIG. 4 is an example web socket server environment 400. In particular embodiments, web socket server environment 400 may include a web client 410, web socket 420, web-socket server 430, socket 440, and RDP server 450. In particular embodiments, web client 410 may correspond to RDP client device 220 and RDP server 450 may correspond to any one or more servers 240. Web client 410 may be a standards-based web browser. Web-socket server 430 may be a proxy server, and web-socket server 430 may be implemented in C or C++ code.

Web-socket server 430 may facilitate connections between RDP server 450 and web client 410. Web client 410 may send one or more packets, for example, JAVASCRIPT packets, protocol data units (PDUs), or any other suitable packets, over web socket 420. Web-socket server 430 may intercept the packets sent from web client 410 over web socket 420 and convert each packet into a socket format, which RDP server 450 may understand. Web-socket server 430 may open a socket 440 that connects with RDP server 450 and send the converted packets (for example, in socket format) to RDP server 450 over socket 440. In particular embodiments, web-socket server 430 may intercept packets sent from RDP server 450 over socket 440, which may be in socket format. Web-socket server 430 may convert the packets into a web-socket format and send the converted packets over web socket 420 to web client 410. In this manner, web-socket server 430 may facilitate data transmissions and any other suitable communications between web client 410 and RDP server 450. The packets communicated to web client 410 may include instructions that cause web client 410 to act as an RDP client or to provide an RDP client, which may mean that the web client 410 may provide a graphical interface for presenting and interacting with a remote desktop. RDP server 450 may provide the remote desktop, which may be published to the web client 410 using an RDP via the connection facilitated by web-socket server 430.

Web client 410, web socket 420, web-socket server 430, socket 440, and RDP server 450 may perform any of the functions and have any of the attributes described in U.S. patent application Ser. No. 14/925,582 titled "Remote Desktop Protocol Client for a Standards-Based Web Browser," filed Oct. 29, 2015, which is incorporated by reference herein.

RDP server 450 may support one or more audio formats, including, for example, ADPCM. Web client 410 may support one or more audio formats, including, for example, PCM. In PCM, audio data may be stored using linear samples, whereas, in ADPCM, audio data may be stored with deltas between samples. In particular embodiments, web-socket server 430 may receive from RDP server 450 packets (for example, PDUs) of audio data in a first audio format (for example, ADPCM) but web client 410 may only support a second audio format (for example, PCM). To address incompatibilities between the first audio format and the second audio format, web client 410 may need to reconstruct received audio data into a compatible format and address synchronicity issues.

In particular embodiments, web client 410 may receive one or more packets (for example, PDUs) of multiple channels of interleaved audio data, for example two channels or any number of channels may be used. Interleaved audio data may be data that is arranged in a non-contiguous way. For example, the bits of the audio data may not be adjacent in time when received. Web client 410 may separate the interleaved audio data into streams of data values communicated by each of the two channels. For example, one stream of data may be communicated for a first channel and one stream of data may be communicated for a second channel. Web client 410 may convert the streams of data values to normalized values between −1 and 1. Streams of data may be received from the RDP server 450 in 32/24/16/8 bit signed values or any other such values known to one of ordinary skill in the art. The web client 410 may normalize this streamed data. In one embodiment, the quality of the streamed data is 16 bits. Each data will have a value between −32768 and 32768. The standards-based web browser 310 may only accept values between 1 and −1 (normalized values). The 16 bit values (−32768 through 32768) must be normalized to obtain values between 1 and −1. Once the web client 410 has reconstructed the data in this manner, web client 410 may feed the converted audio data to, for example, an audio application programming interface (API), such as and WebAudio API, for presentation to a user of the web client 410. In particular embodiments, a worker thread may be used to process incoming audio packets at web client 410 by parsing the data to reconstruct a received ADPCM packet as a PCM packet. The workload associated with processing the data streams is distributed between different worker threads which provides a more responsive session.

Web client 410 may also address synchronicity issues arising from the receipt of one or more packets of differently-formatted audio data (for example, ADPCM audio data). Web client 410 may send a timing packet to RDP server 450 via web-socket server 430. The timing packet may include a total consumption time. The total consumption time may be based, at least in part, on at least one or more of transmission time of the received packets and playback time. The transmission time, may be based, at least in part, on the time it takes for a packet sent by RDP server 450 to reach web client 410. That is, the transmission time may be based, at least in part, on the transmission time for a packet to be sent from RDP server 450 to web-socket server 430 over socket 440, the transmission time for the packet to reach the web client 410 from web-socket server 430 over web socket 420. Web client 410 may receive, from web-socket server 430, an indication of the amount of time that it took for the packet to be sent from RDP server 450 to web-socket server 430. Web client 410 may determine how long it took the packet to be sent from web-socket server 430 to web client 410.

Web client 410 may calculate the playback time of the audio data contained in the received packet. The playback time may be a predicted time determined by the web client 410 for playback of the audio data of the received packet. The playback time may be based, at least in part, on at least one or more playback parameters or criteria. The playback criteria may include any one or more of the number of audio data bits in the received packet, number of channels used to communicate the audio data of the received packet, sampling frequency (for example, as measured in Hertz) of playback, and any other playback criteria known to one of ordinary skill in the art.

Web client 410 may send the total consumption time of the received packet in a timing packet to RDP server 450 by way of web-socket server 430. In one embodiment, the total consumption time may be passed back to the web server 450 using a particular packet, for example, a round trip time (RTT) PDU or WaveConfirm PDU. RDP server 450 may determine, based on the timing packet received from web client 450, how often RDP server 450 should sample from an audio source. RDP server 450 may then adjust its sampling rate based on this determination so that audio data may be properly synchronized at the web client 410.

Although this disclosure describes and illustrates particular embodiments of FIG. 4 as being implemented by web client 410, this disclosure contemplates any suitable embodiments of FIG. 4 occurring on any suitable interface and as being implemented by any suitable platform or system. As an example, and not by way of limitation, particular embodiments of FIG. 4 may be implemented by web-socket server 430. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
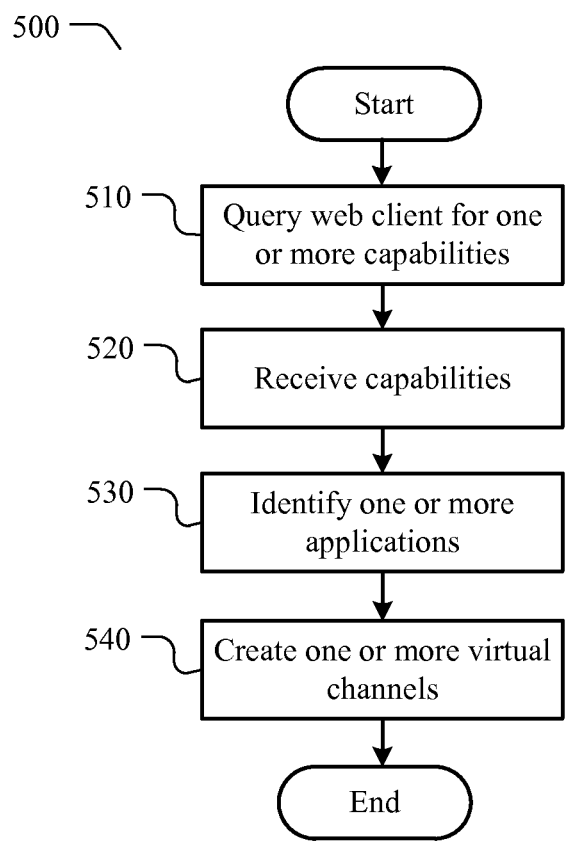
FIG. 5 is an example method for providing audio data in remote desktop protocol for a standards-based web client according to one or more embodiments of the present invention.

FIG. 5 illustrates an example method 500 for providing audio data in remote desktop protocol for a standards-based web client 410. The method may begin at step 510, where web client 410 may receive a packet of audio data from web-socket server 430 over web socket connection 420 between web-socket server 430 and web client 410. This packet may be an RDP packet and may be encoded in an audio format. For example, the audio data may be encoded using ADPCM.

At step 520, the web client 410 may detect, determine or retrieve the audio formats supported by the web browser of the web client 410. At connection time, the RDP server 450 passes a capabilities package or PDU (such as AUDIO_CAPABILITIES_PDU) to the web client 410 which requests from the web client 410 the supported capabilities or supported formats at the web client 410. In one or more embodiments the web client 410 may store the supported audio formats in a table, file, database, register, a basic input/output setting (BIOS) or any other location known to one of ordinary skill in the art. The web client 410 may update the stored audio formats periodically, upon addition and/or removal of an audio format, or at any other frequency or interval known to one of ordinary skill in the art.

At step 530, web client 410 may convert the audio data of the received packet to an audio format compatible for playback by a web browser at the web client 410, or rather, that is one of the supported audio formats of the web browsers. For example, the web browser at web client 410 may only process normalized audio data. The received packet may be an RDP PDU that contains audio data in a PCM stream compressed using ADPCM. ADPCM compresses a PCM stream by inserting deltas between different audio samples. At the web client 410, an ADPCM player may reconstruct the PCM stream from the deltas to convert the audio data to a form supported by the web browser of the web client 410 and normalize the data. The ADPCM player may use JAVASCRIPT or any other cross-platform web scripting language. Converting the audio data may include separating the multiple channels of interleaved audio data into streams of data values and normalizing the values.

At step 540, web client 410 may calculate a total consumption time for the received packet. The calculation may be based, at least in part, on one or more of a transmission time and a playback time. The total consumption time is indicative of the synchronization rate that is required for proper playback of the audio data. The total consumption time may be used by RDP server 450 via web-socket server 430 to determine when to transmit another packet containing audio data for playback at the web client 410 so as to keep the playback of the audio data synchronized.

At step 550, web client 410 sends to RDP server 450 by way of web-socket server 430 a packet that includes the total consumption time. The web-socket server 430 sends the total consumption time packet (for example, as part of the WaveConfirm PDU) to RDP server 450 over a socket connection 440 between web-socket server 430 and RDP server 450. The RDP server 450 may utilize the total consumption time to confirm the client consumed the packet (for example, played the audio data of the packet), to determine the total time required to consume the packet, and to determine if an error occurred.

At step 560, web client 410 may present the audio data using an audio canvas of the web client 410. The audio data may be associated with an interface for viewing and interacting with a remote desktop. In one embodiment, the ADPCM player plays the audio data through a standards-based host web browser 310 of web client 410 utilizing I/O device 330.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing audio data in remote desktop protocol for a standards-based web client 410, including the particular steps of the method of FIG. 5 this disclosure contemplates any suitable method for providing audio data in remote desktop protocol for a standards-based web client 410, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a web client:
   receiving a first packet of audio data from a web-socket server over a web socket connection between the web-socket server and the web client, wherein the first packet is encoded in a first audio format, and wherein the first packet comprises multiple channels of interleaved audio data;
   determining one or more supported audio formats of a web browser of the web client;
   converting the audio data such that the first packet is encoded in a second audio format, wherein the second audio format is one of the one or more supported audio formats, and wherein converting the audio data comprises separating the multiple channels of interleaved audio data into streams of data values and normalizing the data values;
   calculating a total consumption time for the first packet;
   sending a second packet to a remote desktop protocol (RDP) server by way of the web-socket server, wherein the second packet comprises an indication of the total consumption time; and
   presenting the audio data using an audio application programming interface (API) of the web browser, wherein the audio data is associated with an interface for viewing and interacting with a remote desktop published to the web client.

2. The method of claim 1, wherein the total consumption time comprises at least one of a transmission time and a playback time for the first packet.

3. The method of claim 2, wherein the playback time is determined based, at least in part, on at least one of a number of bits of the audio data of the first packet and a sampling frequency of the audio data of the first packet.

4. The method of claim 1, wherein an adaptive delta pulse code modulated (ADPCM) player converts the audio data.

5. The method of claim 4, wherein the ADPCM player is implemented using JAVASCRIPT.

6. The method of claim 1, wherein the first audio format is Adaptive Delta Pulse Code Modulation (ADPCM), and wherein the second audio format is Pulse Code Modulation (PCM).

7. The method of claim 1, wherein the total consumption time is indicative of a synchronization rate required for proper playback of the converted audio data.

8. One or more computer-readable non-transitory storage media embodying software that is operable when executed to:
   receive, at a web client, a first packet of audio data from a web-socket server over a web socket connection between the web-socket server and the web client, wherein the first packet is encoded in a first audio format, and wherein the first packet comprises multiple channels of interleaved audio data;
   determine one or more supported audio formats of a web browser of the web client;

convert the audio data such that the first packet is encoded in a second audio format, wherein the second audio format being is one of the one or more supported audio formats, and wherein converting the audio data comprises separating the multiple channels of interleaved audio data into streams of data values and normalizing the data values;

calculate a total consumption time for the first packet;

send a second packet to a remote desktop protocol (RDP) server by way of the web-socket server, wherein the second packet comprises an indication of the total consumption time; and present the audio data using an audio application programming interface (API) of the web browser, wherein the audio data is associated with an interface for viewing and interacting with a remote desktop published to the web client.

9. The media of claim 8, wherein the total consumption time comprises at least one of a transmission time and a playback time for the first packet.

10. The media of claim 9, wherein the playback time is determined based, at least in part, on at least one of a number of bits of the audio data of the first packet and a sampling frequency of the audio data of the first packet.

11. The media of claim 8, wherein an adaptive delta pulse code modulated (ADPCM) player converts the audio data.

12. The media of claim 11, wherein the ADPCM player is implemented using JAVASCRIPT.

13. The media of claim 8, wherein the total consumption time is indicative of a synchronization rate required for proper playback of the converted audio data.

14. An information handling system comprising: one or more processors; and a memory coupled to the processors comprising instructions executable by the processors, the processors operable when executing the instructions to:

receive, at a web client, a first packet of audio data from a web-socket server over a web socket connection between the web-socket server and the web client, wherein the first packet is encoded in a first audio format, and wherein the first packet comprises multiple channels of interleaved audio data;

determine one or more supported audio formats of a web browser of the web client;

convert the audio data such that the first packet is encoded in a second audio format, wherein the second audio format is one of the one or more supported audio formats, and wherein converting the audio data comprises separating the multiple channels of interleaved audio data into streams of data values and normalizing the data values;

calculate a total consumption time for the first packet;

send a second packet to a remote desktop protocol (RDP) server by way of the web-socket server, wherein the second packet comprises an indication of the total consumption time, and wherein the web-socket server sends the second packet to the RDP server over a socket connection between the web-socket server and the RDP server; and present the audio data using an audio application programming interface (API) of the web browser, wherein the audio data is associated with an interface for viewing and interacting with a remote desktop published to the web client.

15. The information handling system of claim 13, wherein the total consumption time comprises at least one of a transmission time and a playback time for the first packet.

16. The media of claim 15, wherein the playback time is determined based, at least in part, on at least one of a number of bits of the audio data of the first packet and a sampling frequency of the audio data of the first packet.

17. The information handling system of claim 14, wherein an adaptive delta pulse code modulated (ADPCM) player converts the audio data.

18. The information handling system of claim 17, wherein the ADPCM player is implemented using JAVASCRIPT.

19. The information handling system of claim 13, wherein the first audio format is Adaptive Delta Pulse Code Modulation (ADPCM), and wherein the second audio format is Pulse Code Modulation (PCM).

20. The information handling system of claim 14, wherein the total consumption time is indicative of a synchronization rate required for proper playback of the converted audio data.

* * * * *